(12) United States Patent
Lee et al.

(10) Patent No.: US 7,551,257 B2
(45) Date of Patent: Jun. 23, 2009

(54) IN-PLANE SWITCHING MODE LIQUID CRYSTAL DISPLAY DEVICE AND METHOD OF FABRICATING THE SAME

(75) Inventors: Min-Jic Lee, Daegu (KR); Soon-Young Park, Gyeongnam (KR)

(73) Assignee: LG Display, Co., Ltd., Seoul (KR)

( * ) Notice: Subject to any disclaimer, the term of this patent is extended or adjusted under 35 U.S.C. 154(b) by 97 days.

(21) Appl. No.: 11/902,292

(22) Filed: Sep. 20, 2007

(65) Prior Publication Data

US 2008/0094559 A1 Apr. 24, 2008

(30) Foreign Application Priority Data

Oct. 20, 2006 (KR) .................. 10-2006-0102237

(51) Int. Cl.
*G02F 1/1343* (2006.01)
(52) U.S. Cl. .................................... 349/141
(58) Field of Classification Search .............. 349/141, 349/143

See application file for complete search history.

(56) References Cited

U.S. PATENT DOCUMENTS

2006/0250560 A1* 11/2006 Lee et al. .................. 349/141

* cited by examiner

*Primary Examiner*—Charlie Peng
(74) *Attorney, Agent, or Firm*—Morgan Lewis & Bockius LLP

(57) ABSTRACT

An in-plane switching mode liquid crystal display device includes: a gate line on a substrate along a first direction; a data line crossing the gate line along a second direction to define a pixel region; a gate electrode connected to the gate line; a semiconductor layer over the gate electrode; a source electrode and a drain electrode spaced apart from each other on the semiconductor layer; a common line spaced apart from the gate line and disposed along the first direction; a common electrode connected to the common line, the common electrode having a first common electrode pattern and a second common electrode pattern extending from the first common electrode pattern in the pixel region; an auxiliary common electrode extending from the common line, the auxiliary common electrode having a first protrusion pattern overlapping with an end portion of the second common electrode pattern, the first protrusion in parallel with the second common electrode pattern; a pixel electrode connected to the drain electrode, the pixel electrode having a first pixel electrode pattern and a second pixel electrode pattern extending from the first pixel electrode pattern in the pixel region; and an auxiliary pixel electrode extending from the drain electrode, the auxiliary pixel electrode having a second protrusion pattern overlapping an end portion of the second pixel electrode pattern, the second protrusion pattern in parallel with the second pixel electrode pattern.

19 Claims, 13 Drawing Sheets

IN-PLANE SWITCHING MODE LIQUID CRYSTAL DISPLAY DEVICE AND METHOD OF FABRICATING THE SAME

This application claims the benefit of Korean Patent Application No. 10-2006-0102237, filed on Oct. 20, 2006, which is hereby incorporated by reference for all purposes as if fully set forth herein.

BACKGROUND OF THE INVENTION

1. Field of the Invention

The present invention relate to an in-plane switching (IPS) mode liquid crystal display (LCD) device, and more particularly, to an array substrate for an IPS mode LCD device that can obtain a high aperture ratio and a high brightness.

2. Discussion of the Related Art

The conventional LCD devices use an optical anisotropic property and polarization properties of liquid crystal molecules to display images. The liquid crystal molecules have orientation characteristics of arrangement resulting from their thin and long shape. Thus, an arrangement direction of the liquid crystal molecules can be controlled by applying an electrical field to them. Accordingly, when the electric field is applied to them, polarization properties of light is changed according to the arrangement of the liquid crystal molecules such that the LCD devices display images.

Among the known types of LCD devices, active matrix LCD (AM-LCD) devices, which have thin film transistors (TFTs) arranged in a matrix form, are the subject of significant research and development because of their high resolution and superior ability in displaying moving images.

The LCD device includes a first substrate, a second substrate and a liquid crystal layer interposed therebetween. A common electrode and a pixel electrode are respectively formed on the first and second substrates. The first and second substrates may be referred to as a color substrate and an array substrate, respectively. The liquid crystal layer is driven by a vertical electric field induced between the common and pixel electrodes. The LCD device has excellent transmittance and aperture ratio.

However, the LCD device using a vertical electric field has a narrow viewing angle. To overcome this problem, an IPS mode LCD device having a wide viewing angle is suggested.

FIG. 1 is a schematic cross-sectional view of an IPS mode LCD device according to the related art. As shown in FIG. 1, the IPS mode LCD device 1 includes an array substrate "AS," a color filter substrate "CS" and a liquid crystal layer "LC." The array substrate "As" and the color filter substrate "CS" face each other, and the liquid crystal layer "LC" is interposed therebetween. The array substrate "AS" includes a first substrate 10 including a pixel regions "P," a thin film transistor "T," a plurality of common electrodes 18 and a plurality of pixel electrodes 32. The thin film transistor "T," the plurality of common electrodes 18 and the plurality of pixel electrodes 32 are formed in the pixel region "P." The thin film transistor "T" is disposed in the pixel region "P" and includes a gate electrode 12, a semiconductor layer 22, a source electrode 24 and a drain electrode 26. The source and drain electrodes 24 and 26 are spaced apart from each other.

Although not shown, a gate line connected to the gate electrode 12 is formed along a first direction on the first substrate 10, and a data line connected to the source electrode 24 along a second direction on the first substrate 10. The gate line crosses the data line to define the pixel region "P." In addition, although not shown, a common line, which is connected to the plurality of common electrodes 18 and parallel to the gate line, is formed along the first direction on the first substrate 10. The common electrode 18 is formed with the same material at the same layer as the gate electrode 12, and the pixel electrode 32 includes a transparent conductive material.

The color filter substrate "CS" includes a second substrate 40, a black matrix 42 and a color filter layer 44. The black matrix 42 shields portions except for the plurality of pixel regions "P." The color filter layer 44 is formed on the black matrix 42 and corresponds to the plurality of pixel regions "P." Particularly, the color filter layer 44 including a red sub-color filter 44a, a green sub-color filter 44b and a blue sub-color filter (not shown).

The liquid crystal layer "LC" is driven by a horizontal electric field (not shown) induced between each common electrode 18 and each pixel electrode 32.

Further, a gate insulating layer 20 and a passivation layer 31 are disposed between the common electrode 18 and the pixel electrode 32. At this time, at a step difference due to the gate insulating layer 20 and the passivation layer 31 interposed between the common electrode 18 and the pixel electrode 32, liquid crystal molecules of the liquid crystal layer "LC" may be abnormally arranged because of electric field distortion at the step difference. Therefore, the electric field distortion causes disclination. To solve the problem, a structure that the common electrode is formed with the same material at the same layer as the pixel electrode without any step difference therebetween is suggested.

FIG. 2A is a schematic plan view of an array substrate for an IPS mode LCD device with respect to one pixel region according to the related art, and FIG. 2B is a schematic cross-sectional view taken along a line "IIb-IIb" of FIG. 2A according to the related art.

In FIGS. 2A and 2B, a gate line 52 and a data line 68 crossing the gate line 52 are formed in a substrate 50 to define a pixel region "P." A thin film transistor "T" is formed at crossing of the gate and data lines 52 and 68 and includes a gate electrode 54, an active layer 60, a source electrode 64 and a drain electrode 66. A common electrode 74 and a pixel electrode 72 are disposed in the pixel region "P." Specifically, the common electrode 74 includes a first common electrode pattern 74a and a second common electrode pattern 74b diverged from the first common electrode pattern 74a, and the pixel electrode 72 includes a first pixel electrode pattern 72a and a second pixel electrode pattern 72b diverged from the first pixel electrode pattern 72a. In particular, the second common electrode pattern 74b and the second pixel electrode pattern 72b are alternately arranged with each other in the pixel region "P" to generate a horizontal electric field (not shown). The common electrode 74 is connected to a common line 73 parallel with the gate line 52, and the pixel electrode 72 is connected to the drain electrode 66. An auxiliary common electrode 56 extends from the common line 73 and includes first to fourth auxiliary common electrode patterns 56a, 56b, 56c and 56d having a tetragonal frame shape.

Here, the first auxiliary common electrode pattern 56a as a first capacitor electrode, the first pixel electrode pattern 72a as a second capacitor electrode with a gate insulating layer 57 and a passivation layer 69 therebetween as insulators constitute a storage capacitor "Cst."

According to the related art, to obtain a large capacity by increasing the size of the storage capacitor "Cst," the first auxiliary common electrode 56a and the first pixel electrode pattern 72a are manufactured with a relative large size. Therefore, the aperture region is reduced, so it is difficult to obtain a high aperture ratio, a high brightness and a high resolution.

In addition, because the common electrode 74 and the pixel electrode 72 are formed with the same material at the same layer as each other, the common electrode 74 and the pixel electrode 72 should have a predetermined distance with each other to prevent shorting defect between the common electrode 74 and the pixel electrode 72. In particular, the shorting defect may be generated at gap spaces between an end portion of the second common electrode pattern 74b and the first pixel electrode pattern 72a and between an end portion of the second pixel electrode pattern 72b and the first common electrode pattern 74a.

In particular, horizontal electric fields between the first common electrode pattern 74a and the second pixel electrode pattern 72b and between the second common electrode pattern 74b and the first pixel electrode pattern 72a are easily distorted, so there is a problem that the horizontal electric fields badly affects movement of the liquid crystal molecules of the liquid crystal layer "LC."

FIG. 3 is an expanded plan view regarding an area "III" of FIG. 2A according to the related art.

In FIG. 3, two second common electrode patterns 74b are diverged from the first common electrode pattern 74a along the second direction. The second pixel electrode pattern 72b is disposed between the two second common electrode patterns 74b to be in parallel with each other. Further, an end portion of the second pixel electrode pattern 72b is spaced apart from the first common electrode pattern 74a to prevent a shorting defect as above.

Therefore, although a first horizontal electric field "F1" between the second common electrode pattern 74a and the second pixel electrode pattern 72b in a main portion of the pixel region "P" is normally generated, a second horizontal electric field "F2" between an end portion of the second pixel electrode pattern 72b and the first common electrode pattern 74a is electrically distorted.

As a result, because first and second arrangement features of the liquid crystal molecules in accordance with the first and second horizontal electric fields "F1" and "F2" are different from each other, optical properties in accordance with the first and second horizontal electric fields "F1" and "F2" are also different from each other. Therefore, for example, brightness property at a peripheral area "LK" is different from that of the main area of the pixel region "P," so light leakage occur in the peripheral area "LK."

As a result, the peripheral area "LK" should be shielded to prevent reducing an image quality, so the aperture region is reduced. Consequently, the aperture ratio, the brightness, and the resolution are reduced.

Further, to obtain an enough capacity, the storage capacitor is manufactured with a relative large size, so it is difficult to obtain a high aperture ratio.

SUMMARY OF THE INVENTION

Accordingly, embodiments of the present invention are directed to an array substrate for an IPS mode LCD device and a method of fabricating the same that substantially obviates one or more problems due to limitations and disadvantages of the related art.

An object of the present invention is to provide an array substrate for an IPS mode LCD and a method of fabricating the same that obtain a desired aperture region by minimizing a light leakage and reducing a size of a storage capacitor without loss of the capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes: a gate line on a substrate along a first direction; a data line crossing the gate line along a second direction to define a pixel region; a gate electrode connected to the gate line; a semiconductor layer over the gate electrode; a source electrode and a drain electrode spaced apart from each other on the semiconductor layer; a common line spaced apart from the gate line and disposed along the first direction; a common electrode connected to the common line, the common electrode having a first common electrode pattern and a second common electrode pattern extending from the first common electrode pattern in the pixel region; an auxiliary common electrode extending from the common line, the auxiliary common electrode having a first protrusion pattern overlapping with an end portion of the second common electrode pattern, the first protrusion in parallel with the second common electrode pattern; a pixel electrode connected to the drain electrode, the pixel electrode having a first pixel electrode pattern and a second pixel electrode pattern extending from the first pixel electrode pattern in the pixel region; and an auxiliary pixel electrode extending from the drain electrode, the auxiliary pixel electrode having a second protrusion pattern overlapping an end portion of the second pixel electrode pattern, the second protrusion pattern in parallel with the second pixel electrode pattern.

In another aspect, a method of fabricating an in-plane switching mode liquid crystal display device includes: forming a gate line, a gate electrode connected to the gate line, a common line, and an auxiliary common electrode extending from the common line and having a first protrusion pattern, the gate line and the common line spaced apart from each other and disposed along a first direction; forming a gate insulating layer on the gate line, the gate electrode, the common line and the auxiliary common electrode; forming a semiconductor layer on the gate insulating layer over the gate electrode; forming a source electrode and a drain electrode spaced apart from each other on the semiconductor layer, a data line connected to the source electrode and crossing the gate line along a second direction to define a pixel region, and an auxiliary pixel electrode extending from the drain electrode and having a second protrusion pattern; forming a passivation layer on the source electrode, the drain electrode, the data line and the auxiliary pixel electrode; and forming a common electrode and a pixel electrode on the passivation layer, the common electrode having a first common electrode pattern and a second common electrode extending from the first common electrode pattern, the pixel electrode having a first pixel electrode pattern and a second pixel electrode pattern extending from the first pixel electrode pattern, the second common electrode pattern and the second pixel electrode pattern alternately disposed in the pixel region, wherein an end portion of the second common electrode pattern overlaps with the first protrusion pattern and an end portion of the second pixel electrode pattern overlaps with the second protrusion pattern, the first protrusion pattern in parallel with the second common electrode and the second protrusion pattern in parallel with the second pixel electrode pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
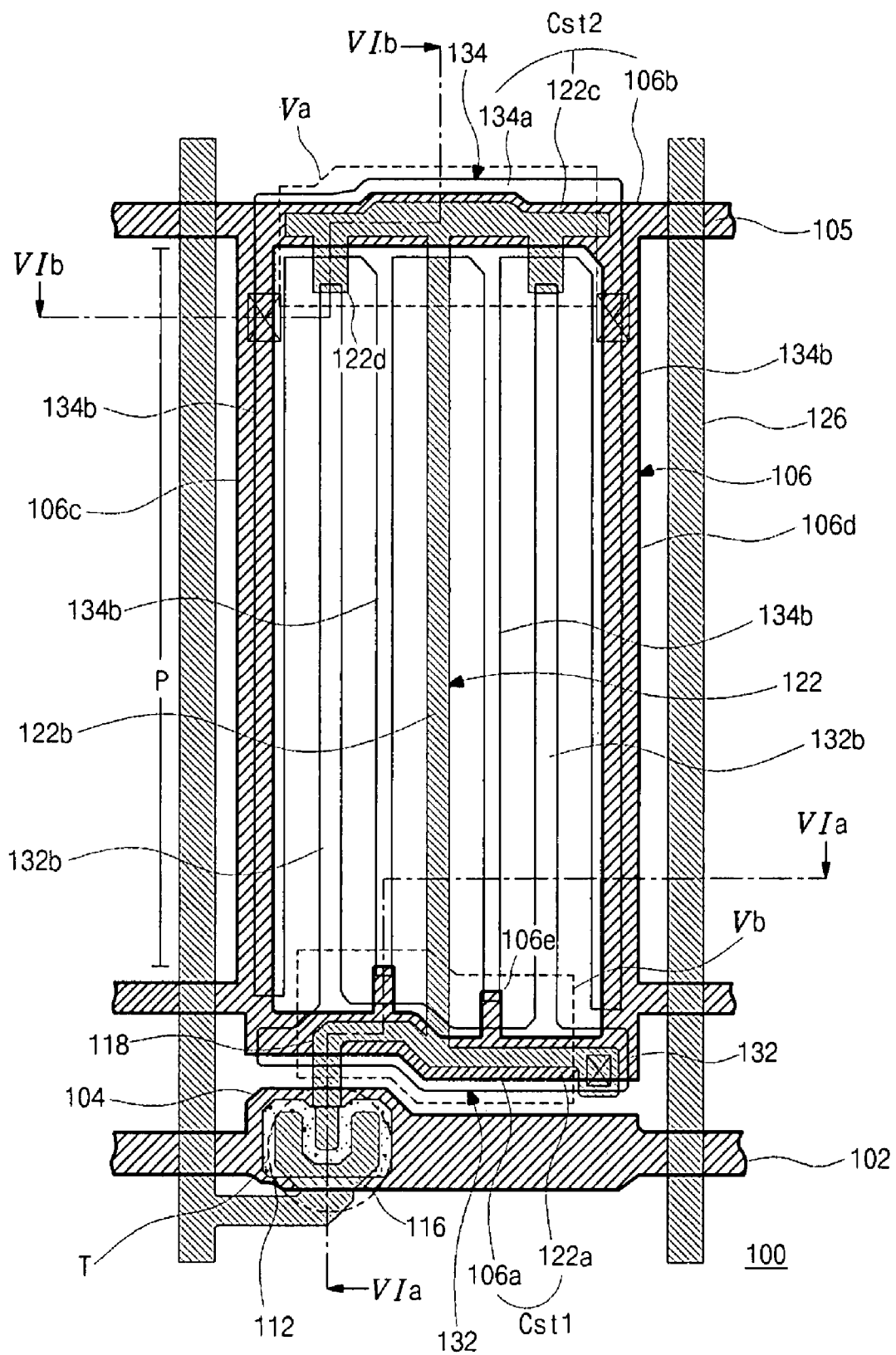
FIG. 4 is a schematic plan view of an array substrate for an IPS mod LCD device with respect to one pixel region according to an embodiment of the present invention.

FIG. 4 is a schematic plan view of an array substrate for an IPS mod LCD device with respect to one pixel region according to an embodiment of the present invention.

In FIG. 4, a gate line 102 is formed on a substrate 100 along a first direction, and a data line 126 crosses the gate line 102 along a second direction to define a pixel region "P." A thin film transistor "T" is formed at crossing of the gate line 102 and the data line 126. Specifically, the thin film transistor "T" includes a gate electrode 104 connected to the gate line 102, an active layer 112 on the gate electrode 104, a source electrode 116 connected to the data line 126 and a drain electrode 118 spaced apart from the source electrode 116.

Furthermore, a common line 105 is formed along the first direction and is spaced apart from the gate line 102. An auxiliary common electrode 106 extends from the common line 105 and includes first to fourth auxiliary common electrode patterns 106a, 106b, 106c and 106d having a tetragonal frame shape surrounding the pixel region "P." Here, the first and second auxiliary common electrode patterns 106a and 106b and the third and fourth auxiliary common electrode patterns 106c and 106d are disposed along a crossing direction to each other. That is, the first auxiliary common electrode pattern 106a is in parallel with the second auxiliary common electrode pattern 106b, and the third auxiliary common electrode pattern 106c is in parallel with the fourth auxiliary common electrode pattern 106d.

A common electrode 134 is connected to the common line 105 and includes a first common electrode pattern 134a and a second common electrode pattern 134b extending from the first common electrode pattern 134a along the second direction. A pixel electrode 132 is connected to the drain electrode 118 and includes a first pixel electrode pattern 132a and a second pixel electrode pattern 132b extending from the first pixel electrode pattern 132a along the second direction. For example, the third and fourth auxiliary common electrode pattern 106c and 106d, the second common electrode pattern 134b, and the second pixel electrode pattern 132b have a bar shape in the pixel region "P," respectively. Here, the second common electrode pattern 134b, and the second pixel electrode pattern 132b are alternately disposed.

Furthermore, an auxiliary pixel electrode 122 extends from the drain electrode 118 and includes a first auxiliary pixel electrode pattern 122a, a second auxiliary pixel electrode pattern 122b extending from the first auxiliary pixel electrode pattern 122a along the second direction, and a third auxiliary pixel electrode pattern 122c extending from the second auxiliary pixel electrode pattern 122b. Here, the second auxiliary pixel electrode pattern 122b acts as an electrode forming a horizontal electric field with adjacent electrodes in the pixel region "P." For example, the third and fourth auxiliary common electrode patterns 106c and 106d are disposed at sides of the pixel region "P" and the second auxiliary pixel electrode pattern 122b is disposed at a central position of the pixel region "P." Accordingly, the second common electrode pattern 134b and the second pixel electrode pattern 132b are disposed between the third auxiliary common electrode pattern 106c and the second auxiliary pixel electrode pattern 122b and between the fourth auxiliary common electrode pattern 106d and the second auxiliary pixel electrode pattern 122b.

The auxiliary common electrode 122 further includes a fifth auxiliary common electrode pattern 106e overlaps an end portion of the second common electrode pattern 134b to be in parallel with each other. The auxiliary pixel electrode 122 further includes a fourth auxiliary pixel electrode pattern 122d overlaps with an end portion of the second pixel electrode pattern 132b to be in parallel with each other.

Meanwhile, an overlapped region between the first auxiliary common electrode pattern 106a and the first auxiliary pixel electrode pattern 122a with a first insulating layer (not shown) therebetween is utilized as a first storage capacitor "Cst1." Here, the first auxiliary common electrode pattern 106a acts as a first capacitor electrode, and the first auxiliary pixel electrode pattern 122a acts as a second capacitor electrode.

In addition, another overlapped regions between the second auxiliary common electrode pattern 106b and the third auxiliary pixel electrode pattern 122c with a second insulating layer (not shown) and between the third auxiliary pixel electrode pattern 122c and the first common electrode pattern 134a with a third insulating layer (not shown) are utilized as a second storage capacitor "Cst2." Here, the second auxiliary common electrode pattern 106b acts as a first capacitor electrode, the third auxiliary pixel electrode pattern 122c acts as a second capacitor electrode, and the first common electrode pattern 134a acts as a third capacitor electrode. Although not shown, the first and second insulating layers may be the same insulating layer. Here, the second storage capacitor "Cst2" corresponds to a parallel storage capacitor.

According to the present invention, the first and second storage capacitors "Cst1" and "Cst2" are disposed at two sides of each pixel region "P," so the first and second storage capacitors "Cst1" and "Cst2" are increased. However, in the case of the first storage capacitor "Cst1," only single insulating layer is interposed between the first and second capacitor electrodes. Since the thickness of an insulator of a storage capacitor is in inverse proportion to the amount of a capacity, the size of the first and second storage capacitors "Cst1" and "Cst2" can be reduced without loss of the capacity.

Figure 1:
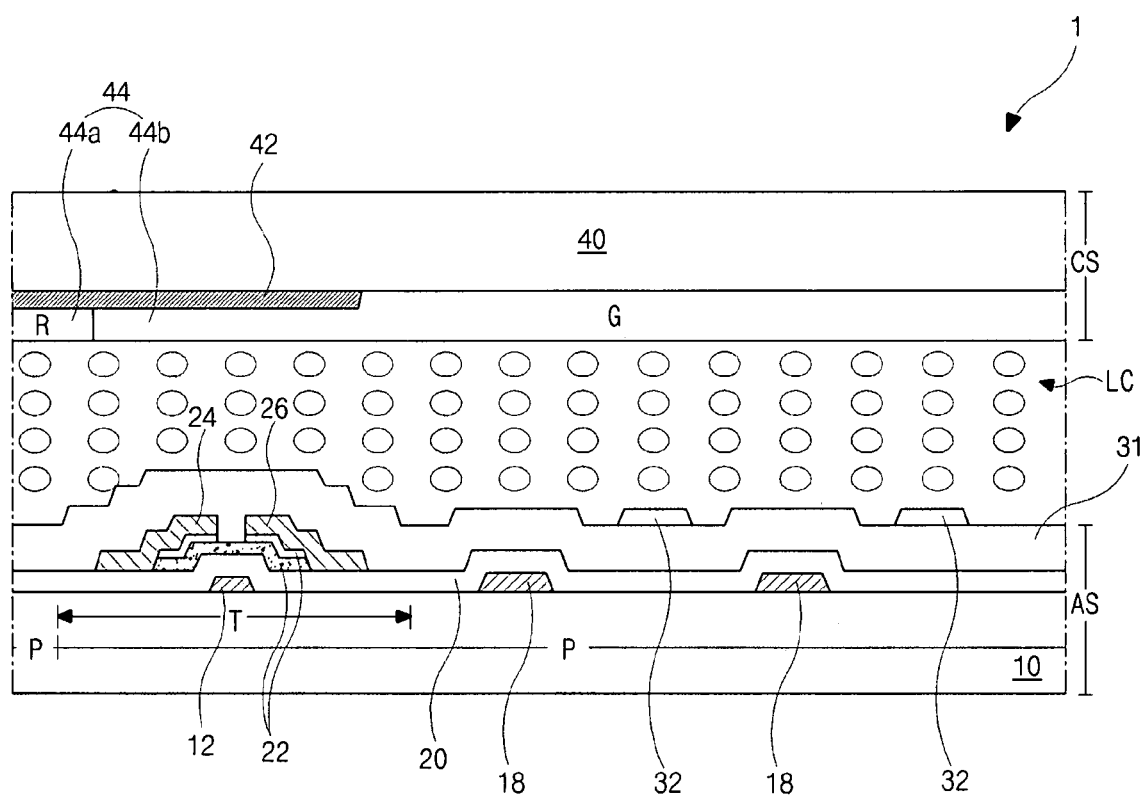
FIG. 1 is a schematic cross-sectional view of an IPS mode LCD device according to the related art.
Figure 2A:
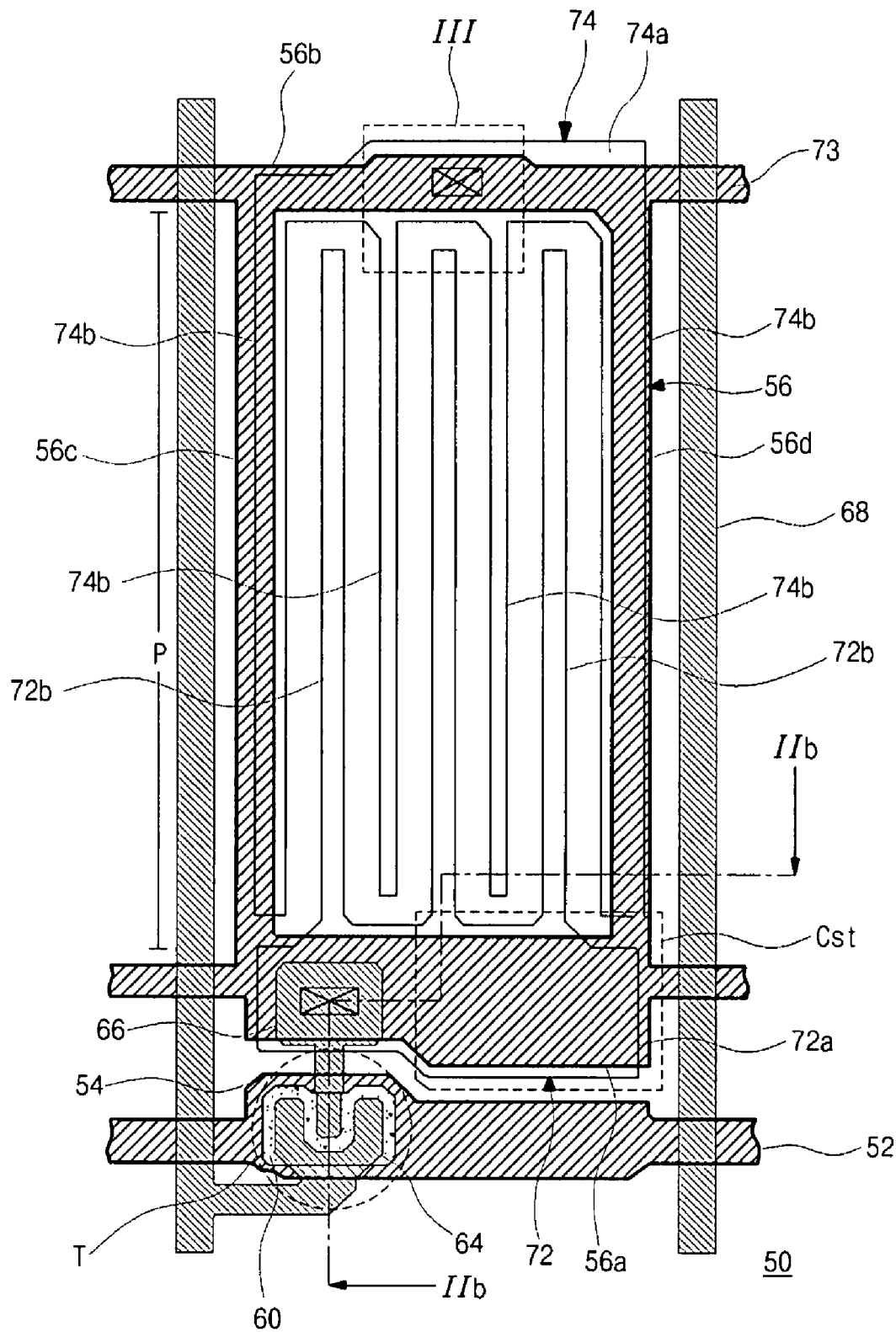
FIG. 2A is a schematic plan view of an array substrate for an IPS mode LCD device with respect to one pixel region according to the related art.
Figure 2B:
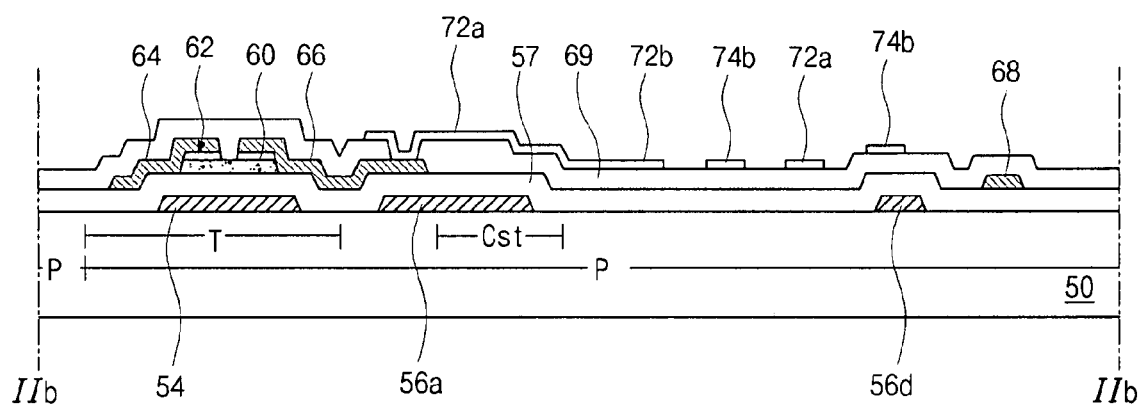
FIG. 2B is a schematic cross-sectional view taken along a line "IIb-IIb" of FIG. 2A according to the related art.
Figure 3:
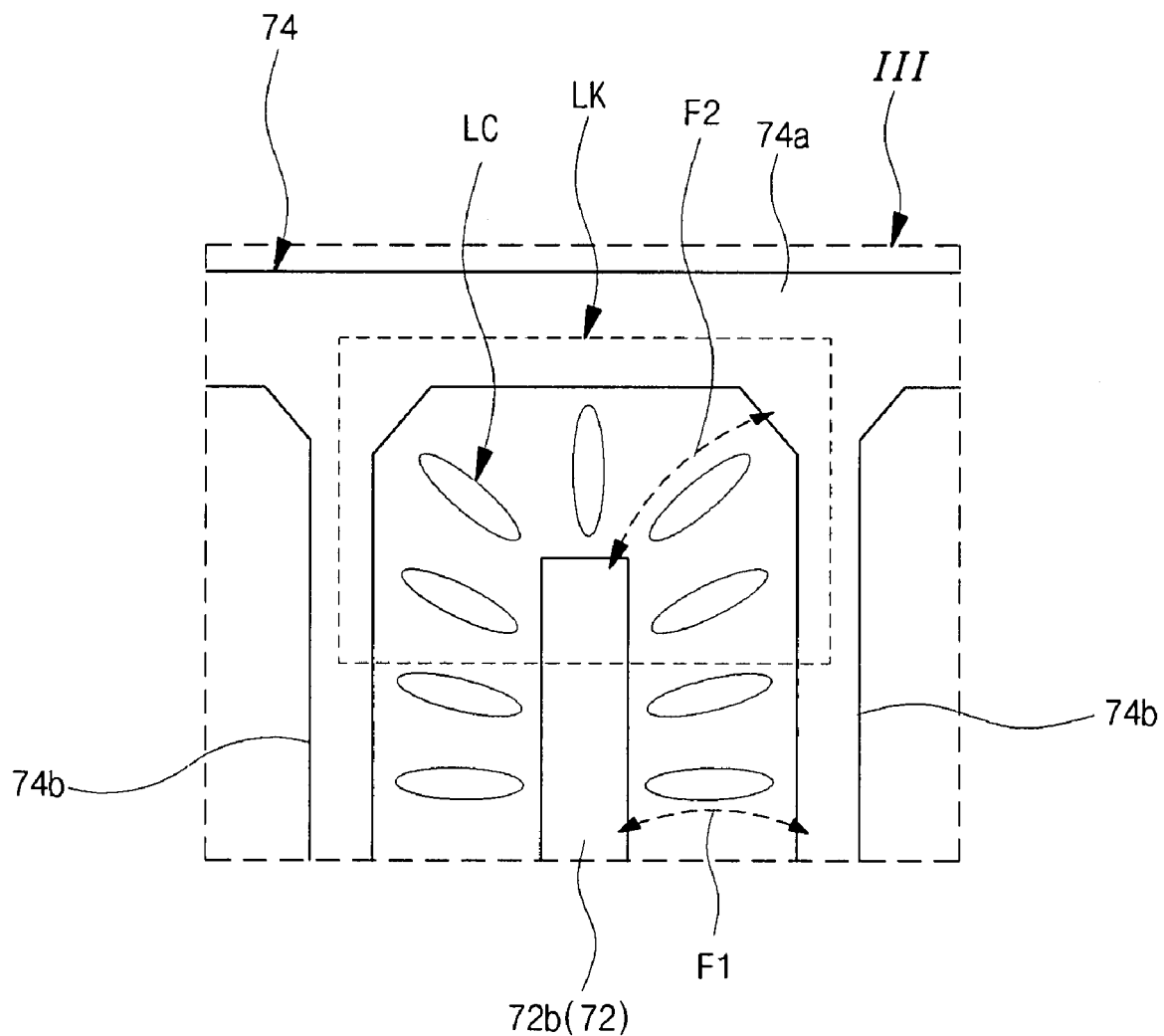
FIG. 3 is an expanded plan view regarding an area "III" of FIG. 2A according to the related art.

Consequently, the size of the second storage capacitor "Cst2" adjacent to the thin film transistor "T" and in connection with the aperture ratio can be reduced without loss of the capacity differently from the related art as shown in FIG. 2A.

Figure 5A:
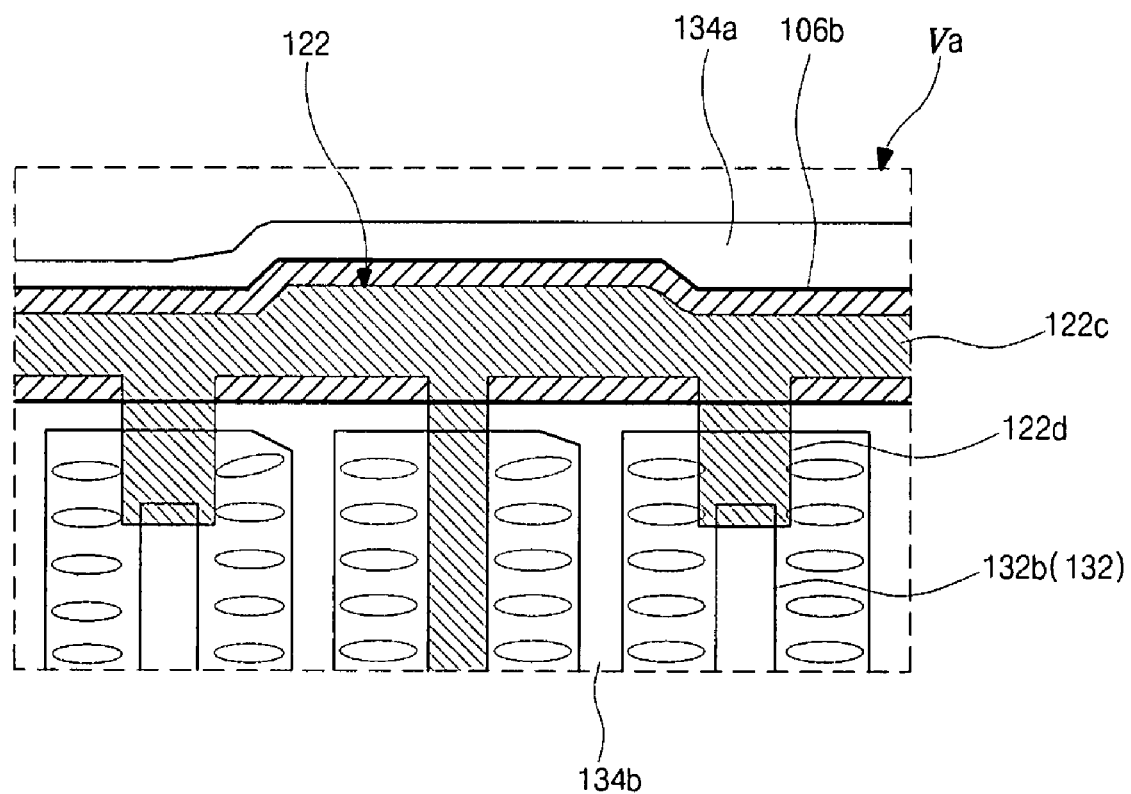
FIGS. 5A and 5B are expanded plan views of FIG. 4 according to an embodiment of the present invention.
Figure 5B:
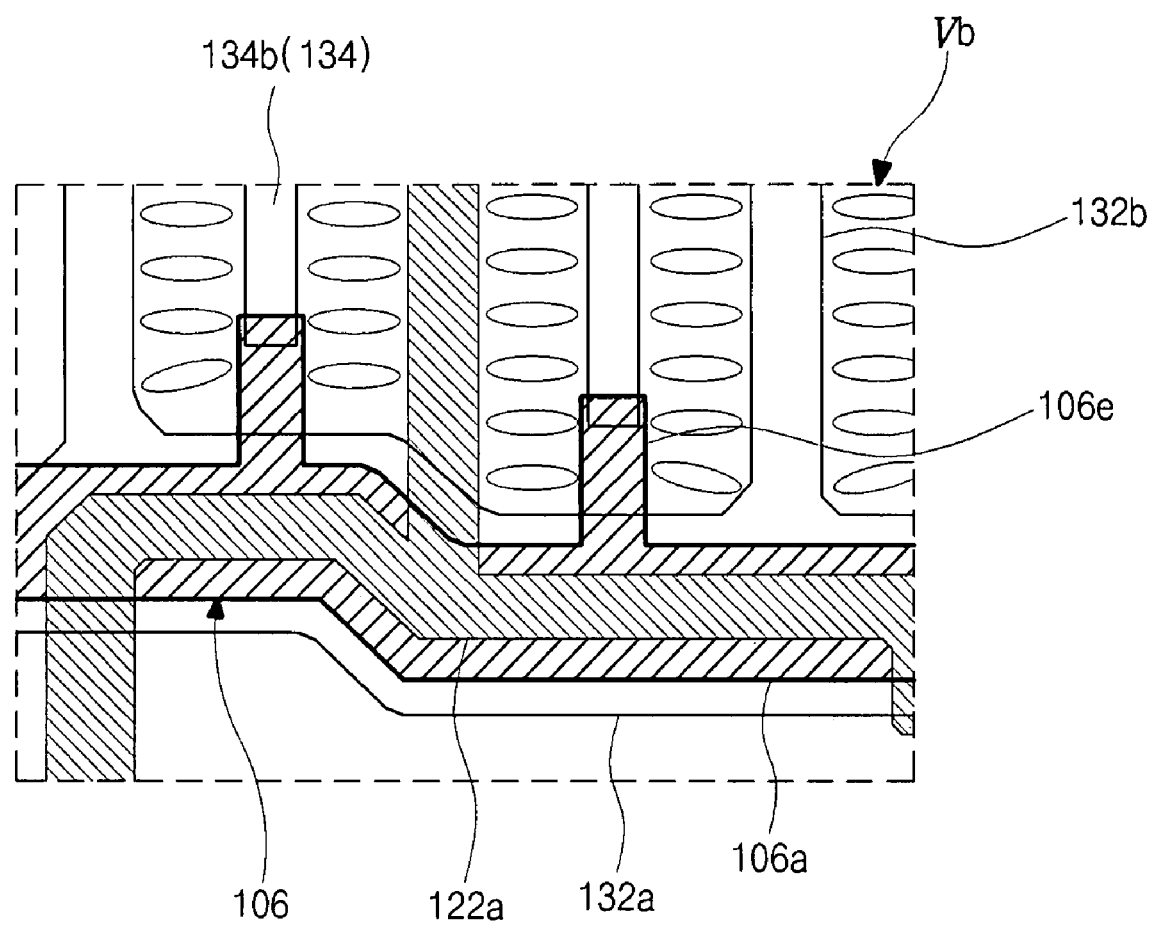

FIGS. 5A and 5B are expanded plan views of FIG. 4 according to an embodiment of the present invention. FIG. 5A is a view regarding an area "Va" of FIG. 4, and FIG. 5B is a view regarding another area "Vb" of FIG. 4.

In FIGS. 5A and 5B, the fifth auxiliary common electrode pattern 106e is connected to the common electrode 134 and overlaps with the end portion of the second common electrode pattern 134b to be in parallel with each other. Accordingly, a gap space between the second common electrode pattern 134b and the first pixel electrode pattern 132a can be removed by the fifth auxiliary common electrode pattern 106e, distortion of the horizontal electric field at the gap space can be solved. Similarly, the fourth auxiliary pixel electrode pattern 122d is connected to the pixel electrode 132 and overlaps with the end portion of the second pixel electrode pattern 132b to be in parallel with each other. Accordingly, the fourth auxiliary pixel electrode pattern 122d can remove another gap space between the second pixel electrode pattern 132b and the first common electrode pattern 134a, so distortion of the horizontal electric field at the other gap space can be also solved.

In other words, since the common electrode 134 and the pixel electrode 132 are formed through the same process with the same material, the common electrode 134 and the pixel electrode 132 should be spaced apart from each other to prevent a shorting defect. Therefore, light leakage defect may occur at respective end portions of the common electrode 134 and the pixel electrode 132. To solve the light leakage defect without loss of the aperture region, the auxiliary common electrode 106 insulated with the pixel electrode 132 at a different layer from the common electrode 134 and the auxiliary pixel electrode 122 insulated with the common electrode 134 at another different layer from the pixel electrode 132 are suggested to change abnormal horizontal electric fields into a desired horizontal electric field.

Consequently, the light leakage defect due to the abnormal horizontal electric field can be reduced, so the aperture region can be increased. That is, a high aperture ratio, a high brightness and a high resolution can be obtained.

Figure 6A:
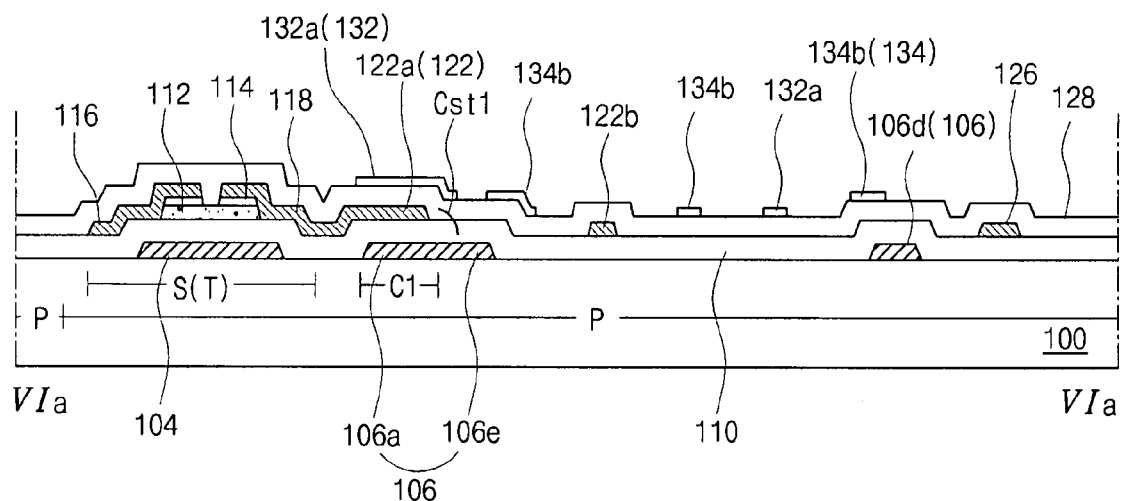
FIGS. 6A and 6B are schematic cross-sectional views taken along lines "VIa-Via" and "VIb-VIb" of FIG. 5 according to an embodiment of the present invention, respectively.
Figure 6B:
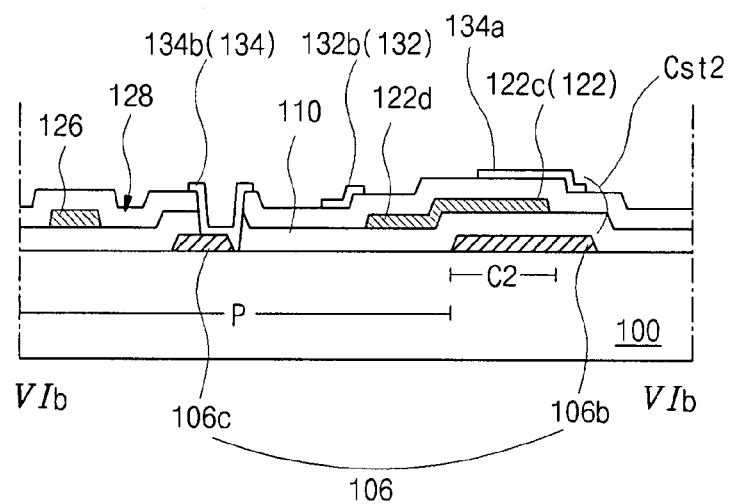

FIGS. 6A and 6B are schematic cross-sectional views taken along lines "VIa-VIa" and "VIb-VIb" of FIG. 5 according to an embodiment of the present invention, respectively.

In FIGS. 6A and 6B, a pixel region "P" including a switching region "S," a first storage region "C1," and a second storage region "C2" are defined in a substrate 100.

In the switching region "S," a gate electrode 104, a gate insulating layer 110 on the gate electrode 104, an active layer 112 on the gate insulating layer 110, an ohmic contact layer 114 on the active layer 112, and source and drain electrode 116 and 118 on the ohmic contact layer 114 constitute a thin film transistor "T." An auxiliary common electrode pattern 106 is disposed in the pixel region "P" and includes first to fourth auxiliary common electrode patterns 106a, 106b, 106c and 106d. An auxiliary pixel electrode 122 extends from the drain electrode 118 and includes first to third auxiliary pixel electrode patterns 122a, 122b and 122c. A passivation layer 128 is formed on the auxiliary pixel electrode 122, and a common electrode 134 and a pixel electrode 132 are formed on the passivation layer 128. Here, the common electrode 134 includes a first common electrode pattern 134a and a second common electrode pattern 134b extending from the first common electrode pattern 134a. The pixel electrode 132 includes a first pixel electrode pattern 132a and a second pixel electrode pattern 132b extending from the first pixel electrode pattern 132a.

At this time, the auxiliary common electrode 106 further includes a fifth auxiliary common electrode pattern 106e, and the auxiliary pixel electrode 122 further includes a fourth auxiliary pixel electrode 122d. The first auxiliary pixel electrode 122a is insulated with the first auxiliary common electrode 106a by the gate insulating layer 110 and is insulated with the first pixel electrode pattern 132a by the passivation layer 130.

The third auxiliary pixel electrode pattern 122c is insulated with the second auxiliary common electrode pattern 106b by the gate insulating layer 110 and is insulated with the first common electrode pattern 134a by the passivation layer 130.

Substantially, the fourth auxiliary pixel electrode 122d pattern is diverged from the third auxiliary pixel electrode pattern 122c, and the fifth auxiliary common electrode pattern 106e is diverged from the first auxiliary common electrode pattern 106a.

In the first storage region "C1," the first auxiliary common electrode pattern 106a acting as a first capacitor electrode, the first auxiliary pixel electrode pattern 122a acting as a second capacitor electrode, and the gate insulating layer 110 acting as an insulator between the first auxiliary common pattern 106a and the first auxiliary pixel electrode pattern 122a constitute a first storage capacitor "Cst1." Furthermore, in the second storage region "C2," the second auxiliary common electrode pattern 106b, the third auxiliary pixel electrode pattern 122c, and the first common electrode pattern 134a constitute a second storage capacitor "Cst2" with the gate insulating layer 110 and the passivation layer 128.

Specifically, the gate insulating layer 110 as a first insulator is disposed between the second auxiliary common electrode pattern 106b and the third auxiliary pixel electrode pattern 122c, and the passivation layer 130 as a second insulator is disposed between the third auxiliary pixel electrode pattern 122c and the first common electrode pattern 134a.

FIGS. 7A to 7E and FIGS. 8A to 8E are schematic cross sectional views showing a manufacturing process of an array substrate for an IPS mode LCD device taken along lines "VII-VII" and "VIII-VIII" according to an embodiment of the present invention, respectively.

Figure 7A:
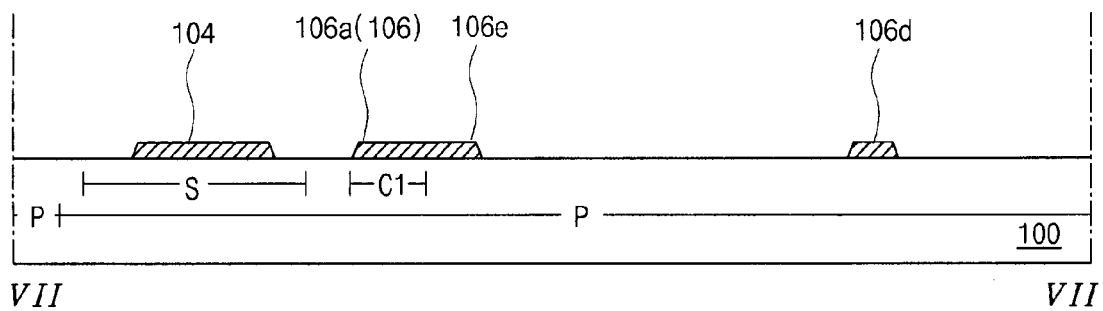
FIGS. 7A to 7E and FIGS. 8A to 8E are schematic cross sectional views showing a manufacturing process of an array substrate for an IPS mode LCD device taken along lines "VII-VII" and "VIII-VIII" according to an embodiment of the present invention, respectively.
Figure 8A:
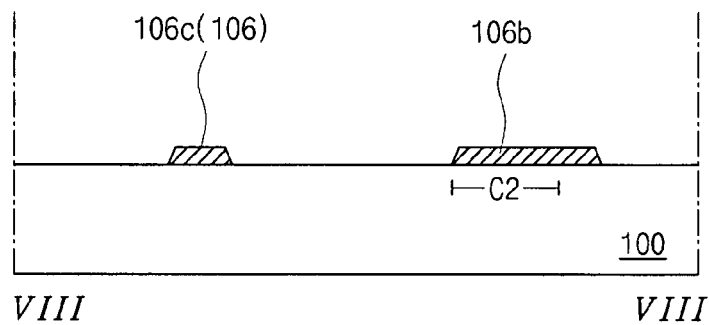

In FIGS. 7A and 8A, a pixel region "P," a switching region "S," a first storage region "C1," and a second storage region "C2." A gate electrode 104, and a auxiliary common electrode 106 including first to fifth auxiliary common electrode patterns 106a, 106b, 106c, 106d and 106e are formed by depositing and patterning one of a conductive metallic material group including aluminum (Al), aluminum alloy, chromium (Cr), molybdenum (Mo), copper (Cu), and titanium (Ti) on the substrate 100. Although not shown, the first to fourth auxiliary common electrode patterns 106a, 106b, 106c and 106d have a tetragonal frame shape and the fifth auxiliary common electrode pattern 106e extends from the first auxiliary common electrode pattern 106a. Here, the first auxiliary common electrode pattern 106a is disposed in the first storage region "C1," and the second auxiliary common electrode pattern 106b is disposed in the second storage region "C2." Although not shown, in this step, the auxiliary common electrode 106 is connected to a common line (not shown) by extending from the common line, and the gate electrode 104 is connected to a gate line that is formed along a first direction. Here, the common line is also formed along the first direction and is spaced apart from the gate line.

Figure 7B:
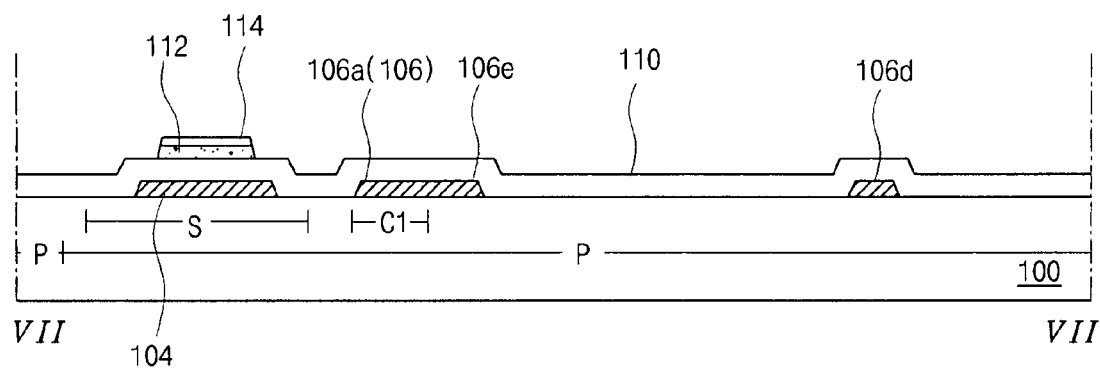
Figure 8B:
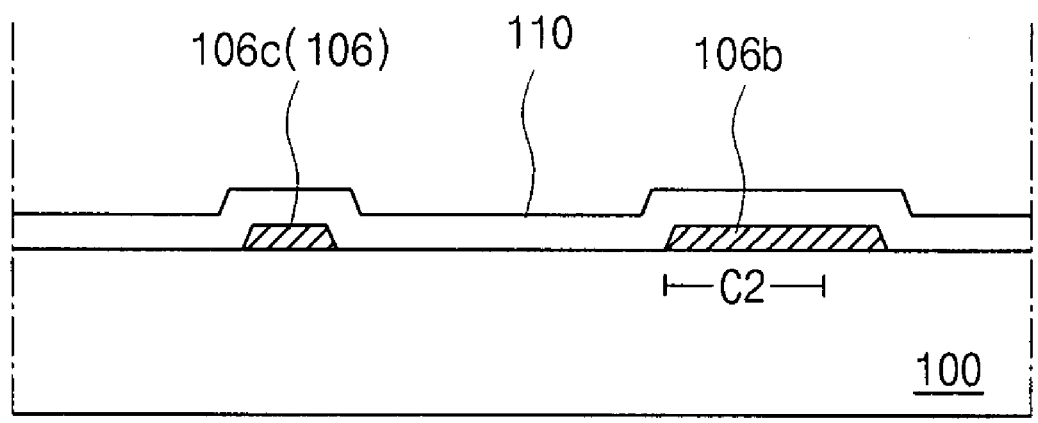

In FIGS. 7B and 8B, a gate insulating layer 110 is formed by depositing one of an inorganic insulating material group including silicon nitride (SiNx) and silicon oxide (SiOx) on the gate electrode 104 and the auxiliary common electrode 106. Sequentially, an active layer 112 and an ohmic contact layer 114 are formed by depositing an intrinsic amorphous silicon material (a-Si:H) and a doped amorphous silicon material (n+a-Si:H) on the gate insulating layer 110, respectively.

Figure 7C:
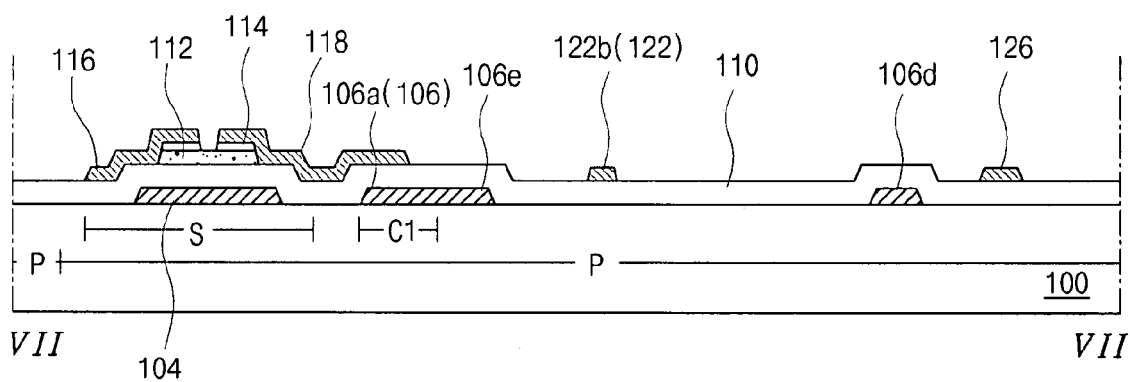
Figure 8C:
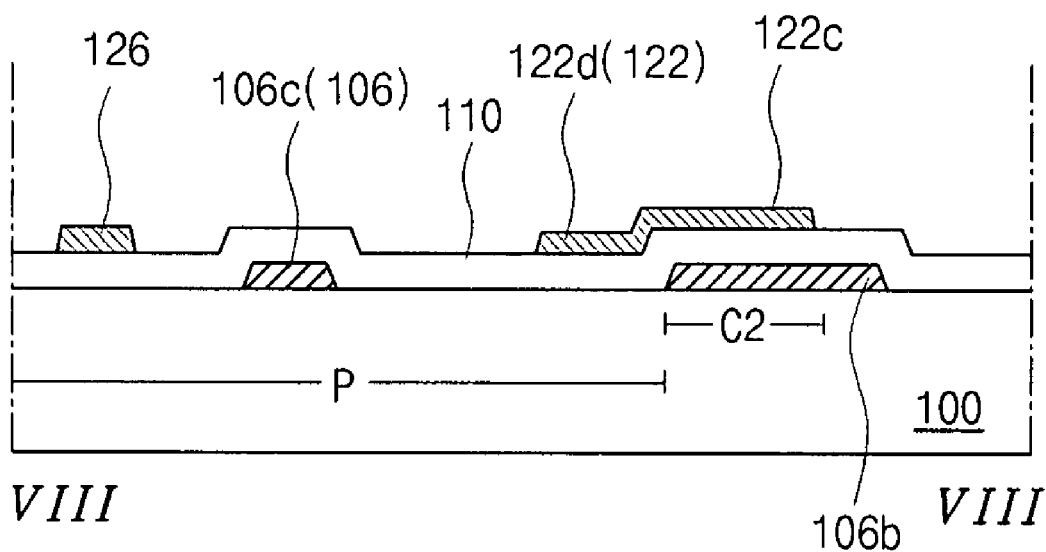

In FIGS. 7C and 8C, a source electrode 116, a drain electrode 118 spaced apart from the source electrode 116, and an auxiliary pixel electrode 122 extending from the drain electrode 118 and including first to fourth auxiliary pixel electrode patterns 122a, 122b and 122c are formed by depositing and patterning one of the mentioned conductive metallic material group on the ohmic contact layer 114. Although not shown, the fourth auxiliary pixel electrode pattern 122d extends from the third auxiliary pixel electrode pattern 122c. Further, although not shown, a data line is connected to the source electrode 116 and cross the gate line along a second direction to define the pixel region "P."

Next, a portion of the ohmic contact layer 114 exposed between the source and drain electrodes 116 and 118 is removed to expose a portion of the active layer 112 corresponding to the portion of the ohmic contact layer 114.

Figure 7D:
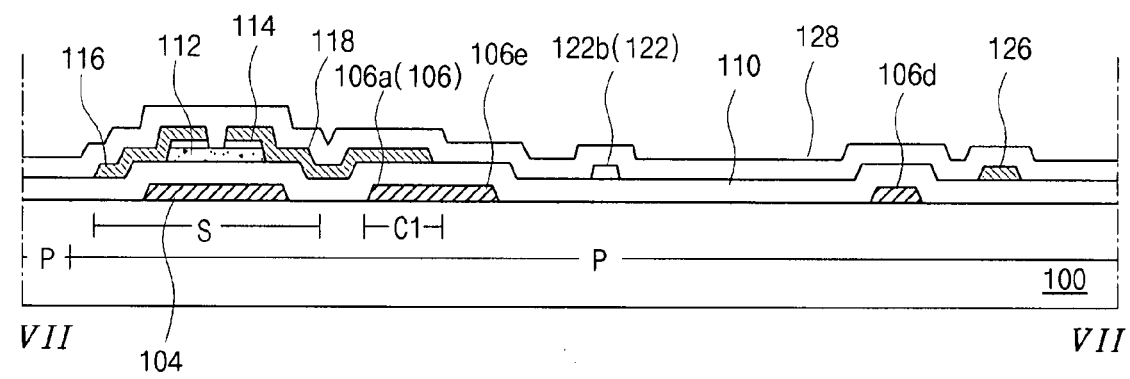
Figure 8D:
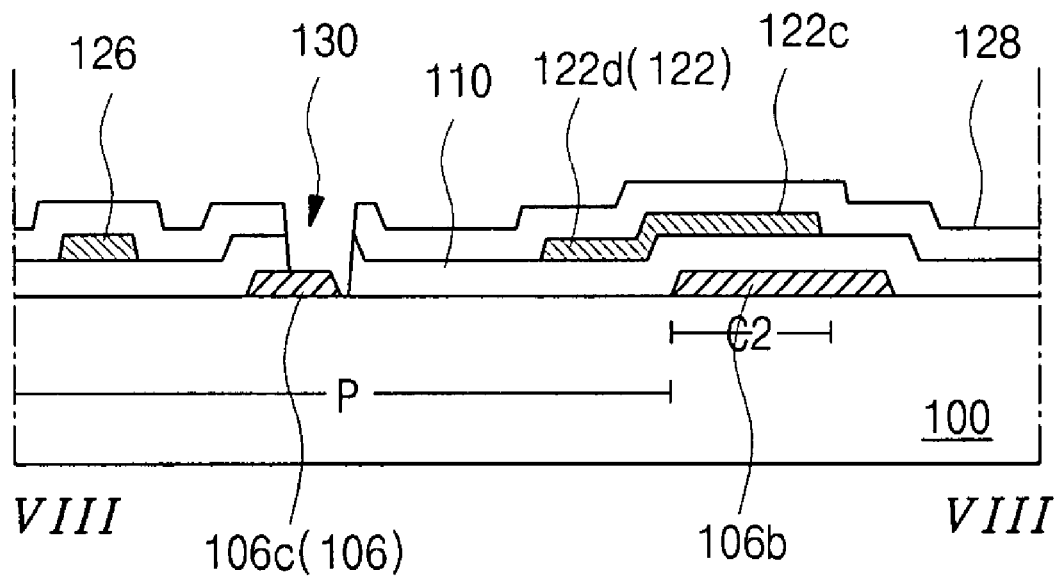

In FIGS. 7D and 8D, a passivation layer 128 is formed by depositing or coating an inorganic insulating material or an organic insulating material on the source and drain electrodes 116 and 118, and the auxiliary pixel electrode 122. Next, a first contact hole (not shown) exposing a portion of the first auxiliary pixel electrode pattern 122a is formed by etching the passivation layer 128, and a second contact hole 130 exposing a portion of the third auxiliary common electrode pattern 106c is formed by etching the passivation layer 128 and the gate insulating layer 110 under the passivation layer 128.

Figure 7E:
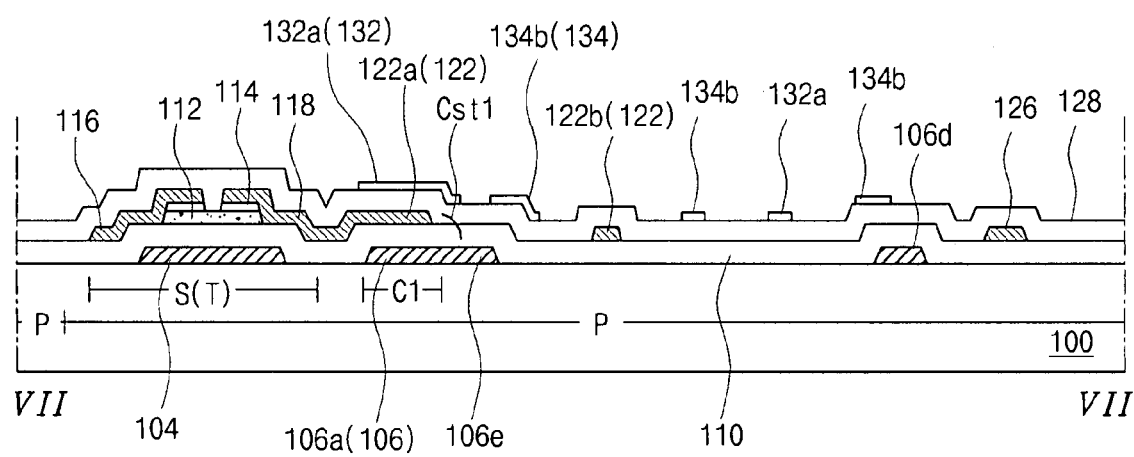
Figure 8E:
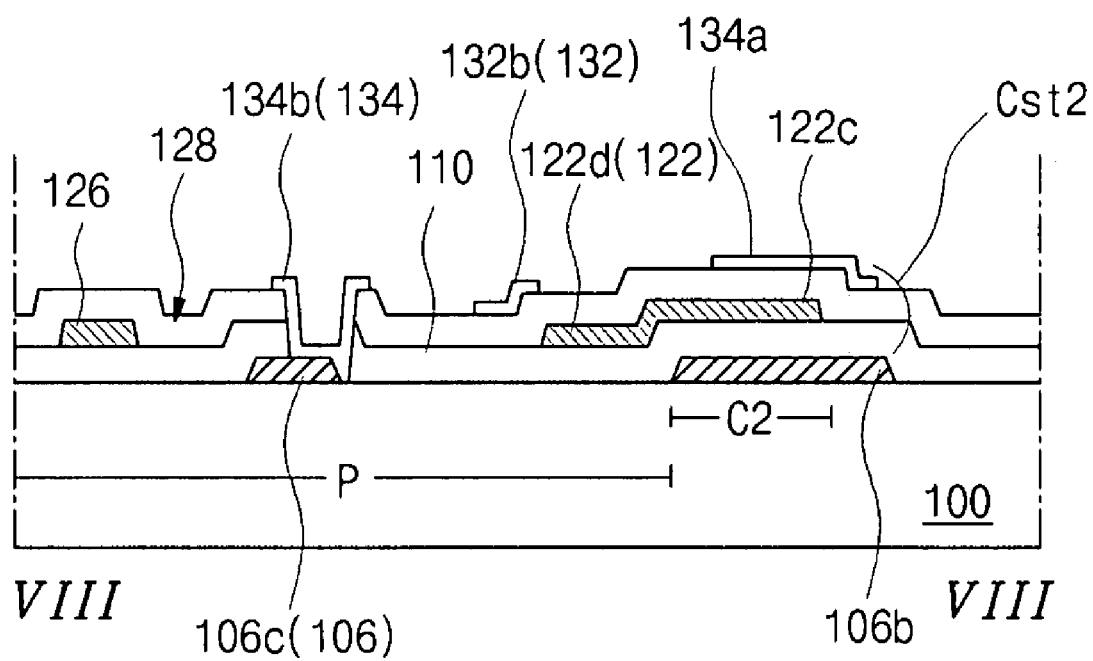

In FIGS. 7E and 8E, a pixel electrode 132 and a common electrode 134 are formed by depositing and patterning one of a transparent conductive material group including an indium tin oxide (ITO) and an indium zinc oxide (IZO) on the passivation layer 128. Specifically, the pixel electrode 132 includes a first pixel electrode pattern 132a and a second pixel electrode pattern 132b extending from the first pixel electrode pattern 132a, and the common electrode 134 includes a first common electrode pattern 134a and a second common electrode pattern 134b extending from the first common electrode pattern 134a. Here, the second pixel electrode pattern 132b and the second common electrode pattern 134b are disposed in the pixel region "P." Although not shown, the second pixel electrode pattern 132b and the second common electrode pattern 134b are formed along the second direction and have a bar shape.

The pixel electrode 132 is connected to the auxiliary pixel electrode 122 via the first contact hole (not shown). The common electrode 134 is connected to the auxiliary common electrode 106 via the second contact hole 130 (of FIG. 8D). In other words, the common electrode 134 receives a common signal from the common line by being connected to the auxiliary common electrode 106 extending from the common line.

In particular, an end portion of the second common electrode pattern 134b overlaps with and is in parallel with the fifth auxiliary common electrode pattern 106e, and an end portion of the second pixel electrode pattern 132b overlaps with and is in parallel with the fourth auxiliary pixel electrode pattern 122d. The first auxiliary common electrode pattern 106a as a first capacitor electrode and the first auxiliary pixel electrode pattern 122a as a second capacitor electrode in the first storage region "C1" with the gate insulating layer 110 therebetween as an insulator constitute a first storage capacitor "Cst1." The second auxiliary common electrode pattern 106b as a first capacitor electrode, the third auxiliary pixel electrode pattern 122c as a second capacitor electrode, and the first common electrode pattern 134a as a third capacitor electrode with the gate insulating layer 110 and the passivation layer 128 as insulators constitute a second storage capacitor "Cst2." Specifically, the gate insulating layer 110 is disposed between the second auxiliary common electrode pattern 106b and the third auxiliary pixel electrode pattern 122c, and the passivation layer 128 is disposed between the third auxiliary pixel electrode pattern 122c and the first common electrode pattern 134a.

According to the IPS mode LCD device of the present invention, the aperture region can be increased by reducing the size of the storage capacitor without loss of the capacity, thereby improving the aperture ratio, the brightness and the resolution.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    a gate line on a substrate along a first direction;
    a data line crossing the gate line along a second direction to define a pixel region;
    a gate electrode connected to the gate line;
    a semiconductor layer over the gate electrode;
    a source electrode and a drain electrode spaced apart from each other on the semiconductor layer;
    a common line spaced apart from the gate line and disposed along the first direction;
    a common electrode connected to the common line, the common electrode having a first common electrode pattern and a second common electrode pattern extending from the first common electrode pattern in the pixel region;
    an auxiliary common electrode extending from the common line, the auxiliary common electrode having a first protrusion pattern overlapping with an end portion of the second common electrode pattern, the first protrusion in parallel with the second common electrode pattern;
    a pixel electrode connected to the drain electrode, the pixel electrode having a first pixel electrode pattern and a second pixel electrode pattern extending from the first pixel electrode pattern in the pixel region; and
    an auxiliary pixel electrode extending from the drain electrode, the auxiliary pixel electrode having a second protrusion pattern overlapping an end portion of the second pixel electrode pattern, the second protrusion pattern in parallel with the second pixel electrode pattern.

2. The device according to claim 1, wherein the auxiliary pixel electrode includes a first auxiliary pixel electrode pattern, a second auxiliary pixel electrode pattern extending from the first auxiliary pixel electrode pattern in the pixel region, and a third auxiliary pixel electrode pattern extending from the second auxiliary pixel electrode pattern.

3. The device according to claim 2, wherein the second protrusion pattern extends from the third auxiliary pixel electrode pattern.

4. The device according to claim 2, wherein the auxiliary common electrode includes first to fourth auxiliary common electrode patterns having a tetragonal frame shape.

5. The device according to claim 4, wherein the first and second auxiliary common electrode patterns are formed along the first direction, and the third and fourth auxiliary common electrode patterns are formed along the second direction, wherein the first auxiliary common electrode pattern overlaps with the first auxiliary pixel electrode pattern, and wherein the second auxiliary common electrode pattern, the third auxiliary pixel electrode pattern, and the first common electrode pattern overlap with each other.

6. The device according to claim 5 wherein the first protrusion pattern extends from the first auxiliary common electrode pattern.

7. The device according to claim 5, wherein an overlapped region between the first auxiliary common pattern and the first auxiliary pixel electrode pattern with a first insulating layer therebetween is utilized as a first storage capacitor, another overlapped regions between the second auxiliary common electrode pattern and the third auxiliary pixel electrode pattern with a second insulating layer therebetween, and between the third auxiliary pixel electrode pattern and the first common electrode pattern with a third insulating layer therebetween are utilized as a second storage capacitor.

8. The device according to claim 7, wherein the first insulating layer and the second insulating layer are the same insulating layer.

9. The device according to claim 1, wherein the common electrode and the pixel electrode are formed on the same layer as each other and include the same material as each other.

10. The device according to claim 9, wherein the same material includes a transparent conductive material such as indium tin oxide (ITO) or indium zinc oxide (IZO).

11. A method of fabricating an in-plane switching mode liquid crystal display device, comprising:
forming a gate line, a gate electrode connected to the gate line, a common line, and an auxiliary common electrode extending from the common line and having a first protrusion pattern, the gate line and the common line spaced apart from each other and disposed along a first direction;
forming a gate insulating layer on the gate line, the gate electrode, the common line and the auxiliary common electrode;
forming a semiconductor layer on the gate insulating layer over the gate electrode;
forming a source electrode and a drain electrode spaced apart from each other on the semiconductor layer, a data line connected to the source electrode and crossing the gate line along a second direction to define a pixel region, and an auxiliary pixel electrode extending from the drain electrode and having a second protrusion pattern;
forming a passivation layer on the source electrode, the drain electrode, the data line and the auxiliary pixel electrode; and
forming a common electrode and a pixel electrode on the passivation layer, the common electrode having a first common electrode pattern and a second common electrode extending from the first common electrode pattern, the pixel electrode having a first pixel electrode pattern and a second pixel electrode pattern extending from the first pixel electrode pattern, the second common electrode pattern and the second pixel electrode pattern alternately disposed in the pixel region,
wherein an end portion of the second common electrode pattern overlaps with the first protrusion pattern and an end portion of the second pixel electrode pattern overlaps with the second protrusion pattern, the first protrusion pattern in parallel with the second common electrode and the second protrusion pattern in parallel with the second pixel electrode pattern.

12. The method according to claim 11, wherein the forming the auxiliary pixel electrode includes forming a first auxiliary pixel electrode pattern, a second auxiliary pixel electrode pattern extending from the first auxiliary pixel electrode pattern in the pixel region, and a third auxiliary pixel electrode pattern extending from the second auxiliary pixel electrode pattern.

13. The method according to claim 12, wherein the second protrusion pattern extends from the third auxiliary pixel electrode pattern.

14. The method according to claim 12, wherein the auxiliary common electrode includes first to fourth auxiliary common electrode patterns having a tetragonal frame shape.

15. The method according to claim 14, wherein the first and second auxiliary common electrode patterns are formed along the first direction, and the third and fourth auxiliary common electrode patterns are formed along the second direction, wherein the first auxiliary common electrode pattern overlaps with the first auxiliary pixel electrode pattern, and wherein the second auxiliary common electrode pattern, the third auxiliary pixel electrode pattern, and the first common electrode pattern overlap with each other.

16. The method according to claim 15, wherein the first protrusion pattern extends from the first auxiliary common electrode pattern.

17. The method according to claim 15, wherein an overlapped region between the first auxiliary common pattern and the first auxiliary pixel electrode pattern with the gate insulating layer therebetween is utilized as a first storage capacitor, another overlapped regions between the second auxiliary common electrode pattern and the third auxiliary pixel electrode pattern with the gate insulating layer therebetween, and between the third auxiliary pixel electrode pattern and the first common electrode pattern with the passivation layer therebetween are utilized as a second storage capacitor.

18. The method according to claim 11, wherein the forming the passivation layer includes forming a first contact hole in the passivation layer and the gate insulating layer and forming a second contact hole in the passivation layer, the first contact hole exposing a portion of the auxiliary common electrode and the second contact hole exposing a portion of the auxiliary pixel electrode.

19. The method according to claim 18, wherein the common electrode is connected to the common line via the first contact hole through the auxiliary common electrode, and the pixel electrode is connected to the drain electrode via the second contact hole through the auxiliary pixel electrode.

* * * * *